(12) United States Patent
Su Yu et al.

(10) Patent No.: US 7,169,447 B2
(45) Date of Patent: Jan. 30, 2007

(54) ACHROMATIC QUARTER WAVE FILM

(75) Inventors: Jeong Su Yu, Daejon (KR); Moon Soo Park, Daejon (KR); Byoung Kun Jeon, Chungcheongnam-do (KR); Karl Skjonnemand, Southampton (GB); Kim Slaney, Dorset (GB); Mark Verrall, Salisbury (GB)

(73) Assignees: Merck Patent GmbH, Darmstadt (DE); LG Chemical Ltd., Seoul (KR)

( * ) Notice: Subject to any disclaimer, the term of this patent is extended or adjusted under 35 U.S.C. 154(b) by 98 days.

(21) Appl. No.: 10/434,366

(22) Filed: May 9, 2003

(65) Prior Publication Data

US 2004/0032677 A1 Feb. 19, 2004

(30) Foreign Application Priority Data

May 17, 2002 (EP) .................... 02010985

(51) Int. Cl.
*G02B 5/30* (2006.01)
*G02F 1/1335* (2006.01)
*G02F 1/13363* (2006.01)

(52) U.S. Cl. .......... 428/1.1; 428/1.2; 428/1.3; 428/500; 349/117; 349/118; 349/119; 349/120; 349/121; 349/137; 349/96; 359/499; 359/501

(58) Field of Classification Search ......... 428/1.1, 428/1.2, 1.3, 500; 252/299.01; 349/117, 349/119, 121, 98, 118, 120, 137, 96; 359/499, 359/501
See application file for complete search history.

(56) References Cited

U.S. PATENT DOCUMENTS

| 6,201,588 | B1 * | 3/2001 | Walton et al. | 349/123 |
|---|---|---|---|---|
| 6,204,904 | B1 * | 3/2001 | Tillin et al. | 349/119 |
| 6,577,364 | B1 * | 6/2003 | Tillin et al. | 349/119 |
| 6,735,017 | B1 * | 5/2004 | Acosta et al. | 359/497 |
| 6,765,640 | B1 * | 7/2004 | Acosta et al. | 349/119 |

FOREIGN PATENT DOCUMENTS

| EP | 0 303 111 A | | 2/1989 |
|---|---|---|---|
| EP | 0 840 160 A | | 5/1998 |
| EP | 0 864 907 A | | 9/1998 |
| EP | 0 940 707 A | | 9/1999 |
| GB | 2331812 | * | 6/1999 |
| WO | WO 98 04651 A | | 2/1998 |
| WO | WO 00 70394 A | | 11/2000 |

* cited by examiner

*Primary Examiner*—Shean C Wu
(74) *Attorney, Agent, or Firm*—Millen, White, Zelano & Branigan, P.C.

(57) ABSTRACT

An achromatic quarter wave film (AQWF) comprising at least one quarter wave film (QWF) and at least one half wave film (HWF), each of said QWF and HWF comprising polymerized or vitrified anisotropic material, to methods and materials for the preparation of the AQWF, its use in optical devices like compensators and liquid crystal displays, and to a liquid crystal display comprising such an AQWF.

27 Claims, 2 Drawing Sheets

ACHROMATIC QUARTER WAVE FILM

FIELD OF INVENTION

The invention relates to an achromatic quarter wave film (AQWF) comprising at least one quarter wave film (QWF) and at least one half wave film (HWF), each of said QWF and HWF comprising polymerized or vitrified liquid crystalline material. The invention further relates to methods and materials for the preparation of the AQWF, its use in optical devices like compensators and liquid crystal displays, and to a liquid crystal display comprising such an AQWF.

BACKGROUND AND PRIOR ART

Quarter wave retardation films (QWFs, ¼ waveplates or λ/4 films) are known in prior art. A QWF creates a phase difference of π/2 in two linearly polarized light rays having vibration planes perpendicular to each other, and thus convert for example linearly polarized light into circular polarized light or vice versa. It typically consists of a polymer film that is stretched uniaxially to give anisotropic optical properties, and can be used as optical phase retarders for example in liquid crystal displays (LCD) or other optical systems. However, as the retardation of a conventional QWF, for example made of stretched polycarbonate (PC), varies with the wavelength of light, it can be used only in a narrow wavelength range Achromatic QWFs (AQWFs) are also known in prior art. An AQWFs (or broad band QWF) converts linearly polarized light into circular polarized light at all visible wavelengths, which is a considerable advantage for many applications. For example, if an AQWF is used instead of conventional QWF in a reflective or transflective LCD, the contrast ratio of the LCD increases sharply.

In prior art several methods are known how to create an AQWF. For example, stretched ½ and ¼ waveplates of materials with different birefringence dispersion were laminated with their optical axis orthogonal to each other to form an AQWF (for example in S. Pancharatnama, *The proceedings of the Indian Academy of Science*, Vol. XLI, No. 4, Sec. A, 1955). Furthermore, an AQWF comprising stretched ¼ waveplate films made of a mixture of positive and negative photoelastic polymers has been described (A. Uchiyama, T. Yatabe; *SID 01 Digest*, 566, 2001). Also, stretched ½ and ¼ waveplate films made of materials with the same birefringence dispersion were arranged with their optical axis at an angle of 60° ti give an AQWF (M. Okamoto, K. Minoura, S. Mitsui, IDW99, 49, 1999). Furthermore, AQWFs comprising laminated waveplates comprising one or more stretched ½ waveplates and one or more stretched ¼ waveplates arranged at various angles have been disclosed for example in JP-A-05-100114, U.S. Pat. No. 6,025,958 and EP-A-0 989 441.

However, the performance of the AQWFs of prior art is still not satisfying for specific applications. Also, QWFs of stretched polymer films often have only moderate birefringece and therefore require high thickness to give the necessary optical retardation. In particular in case of laminated waveplates the use of more than two films is expensive, raises manufacturing problems and leads to undesirable high thickness of the AQWF, which is a disadvantage especially for use in flat panel LCDs.

SUMMARY OF THE INVENTION

One aim of the present invention is to provide an achromatic quarter wave film (AQWF) which has improved performance when used in LCDs, in particular in reflective and transflective LCDs, is easy to manufacture, in particularly for mass production, and does not have the drawbacks of prior art compensators as described above. Other aims of the present invention are immediately evident to the person skilled in the art from the following detailed description.

The inventors have found that the above described problems can be solved by providing an AQWF comprising at least one quarter wave film (QWF) and at least one half wave film (HWF), characterized in that said at least one QWF and said at least one HWF comprise a polymerized or vitrified liquid crystalline material.

Definition of Terms

In connection with optical polarisation, compensation and retardation layers, films or plates as described in the present application, the following definitions of terms as used throughout this application are given.

The term 'planar structure' or 'planar orientation' means that the optical axis of the film is substantially parallel to the film plane. Such a film is hereinafter also shortly referred to as "planar film".

In a planar film comprising uniaxially positive birefringent liquid crystal material with uniform orientation, the optical axis of the film as referred to throughout this invention is given by the orientation direction of the main molecular axes of the mesogens of the liquid crystal material.

The term 'film' as used in this application includes self-supporting, i.e. free-standing, films that show more or less pronounced mechanical stability and flexibility, as well as coatings or layers on a supporting substrate or between two substrates.

The term 'vitrified' means a solidified glassy like, non-polymerized material.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behavior. Liquid crystal compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

For the sake of simplicity, the term 'liquid crystal material' is used hereinafter for both liquid crystal materials and mesogenic materials, and the term 'mesogen' is used for the mesogenic groups of the material.

Polymerizable compounds with one polymerizable group are also referred to as 'monoreactive' compounds, compounds with two polymerizable groups as 'direactive' compounds, and compounds with more than two polymerizable groups as 'multireactive' compounds. Compounds without a polymerizable group are also referred to as 'non-reactive' compounds.

The present invention relates to an achromatic quarter wave film (AQWF) comprising at least one quarter wave film (QWF) and at least one half wave film (HWF), wherein said at least one QWF and said at least one HWF comprise a polymerized or vitrified liquid crystalline material.

The invention further relates to a method of preparing an AQWF as described above and below.

The invention further relates to the use of an AQWF as described above and below as retardation or compensation film or as light-enhancing or anti-reflection film in optical devices, for example, liquid crystal displays (LCD), organic light emitting diodes (OLED), cathode ray tube (CRT) displays, or other applications.

The invention further relates to an LCD comprising an AQWF as described above and below.

BRIEF DESCRIPTION OF THE DRAWINGS

Various features and attendant advantages of the present invention will be more fully appreciated as the same becomes better understood when considered in conjuction with the accompanying drawings.

DETAILED DESCRIPTION OF THE INVENTION

Figure 1:
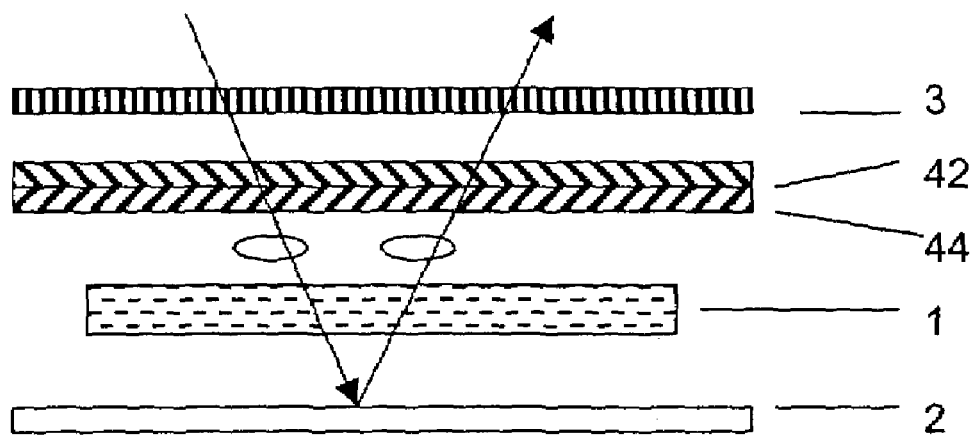
FIG. 1 illustrates a reflective LCD comprising an AQWF according to the present invention.

The use of liquid crystal material for the AQWF of the present invention has several advantages. The LC materials have a high birefringence and thus enable high retardation values already with thin films. Preferred ranges for birefringence are >0.1, in particular 0.1 to 0.3. Retardation values are the multiplication product of thickness and birefringence. Also, the LC materials can be selected fom a wide range of materials which are known to the expert and have a wide range of optical properties like birefringence and dispersion.

Preferably, the AQWF according to the present invention comprises one QWF and one HWF.

The retardation of the QWF is preferably from 80 to 180 nm, very preferably from 100 to 130 nm, at a wavelength of 550 nm.

The retardation of the HWF is preferably from 200 to 360 nm, very preferably from 220 to 260 nm, at a wavelength of 550 nm. The thickness of the QWF is preferably from 0.6 to 1.4 µm, very preferably from 0.9 to 1.2 µm.

The thickness of the HWF is preferably from 1.4 to 3 µm, very preferably from 1.6 to 2.2 µm.

The QWF and the HWF are preferably arranged such that their film planes are substantially parallel to each other and their optical axes are crossed at an angle of from 40 to 80 degrees, preferably from 55 to 65 degrees.

Preferably, the QWF and HWF comprise a polymerized or crosslinked liquid crystal polymer film with planar orientation.

Preferably, the QWF and HWF are prepared from a polymerizable nematic or smectic, preferably nematic liquid crystal material by in-situ polymerization. In a preferred method of preparation the polymerizable material is coated onto a substrate, oriented into planar orientation and subsequently polymerized for example by exposure to heat or actinic radiation. The preparation of a planar film and its use as QWF is described, for example, in WO 98/04651, the entire disclosure of which is incorporated into this application by reference.

Preferably, the AQWF further comprises a linear polarizer. For use in LCDs the AQWF and the polarizer are preferably arranged in the sequence Polarizer-HWF-QWF.

The QWF and HWF and optional further optical film like polarizers or further retarders can be laminated together, or connected by means of adhesive layers, for example, TAC or DAC (tri- or diacetylcellulose) films. It is also possible to prepare the films directly onto each other, so that, e.g., the QWF is prepared on the HWF serving as substrate, or vice versa, with a suitable aligning layer such as PVA being coated between the two layers and being rubbed at a suitable angle.

Another aspect of the present invention relates to a liquid crystal display comprising at least one AQWF as described above and below.

The AQWF according to the present invention can be used for compensation of conventional displays, in particular those of the TN (twisted nematic), HTN (highly twisted nematic) or STN (super twisted nematic) mode, in AMD-TN (active matrix driven TN) displays, in displays of the IPS (in plane switching) mode, which are also known as 'super TFT' displays, in displays of the DAP (deformation of aligned phases) or VA (vertically aligned) mode, like, e.g., ECB (electrically controlled birefringence), CSH (color super homeotropic), VAN or VAC (vertically aligned nematic or cholesteric) displays, MVA (multi-domain vertically aligned) displays, in displays of the bend mode or hybrid type displays, like, e.g., OCB (optically compensated bend cell or optically compensated birefringence), R-OCB (reflective OCB), HAN (hybrid aligned nematic) or pi-cell (π-cell) displays, or organic light emitting diodes (OLED)

Especially preferred are TN, STN, VA, MVA, OCB and pi-cell displays.

Furthermore the AQWF is suitable as light-enhancing or anti-reflection circular polarizer film in LCDs of the above mentioned types or in other displays or optical devices like organic light emitting diodes (OLED) or cathode ray tubes (CRT).

When an AQWF according to the invention is used in an LCD, the contrast ratio of the display is increased compared to the same display containing a chromatic QWF. Another advantage of using an AQWF according to the invention is that the display appears black in the dark state relative to a chromatic QWF. The dark state of a LCD containing a chromatic QWF normally appears colored when viewed under ambient lighting conditions.

Especially preferred are reflective or transflective LCDs, in particular those of the TN type. Further preferred are transmissive LCDs.

FIG. 1 exemplarily depicts a reflective LCD according to the invention, comprising a switchable liquid crystal cell 1, like, for example, a TN cell, a reflective layer 2, a linear polarizer 3, and an AQWF according to the invention comprising a HWF 42 and a QWF 44. The AQWF converts linearly polarized light transmitted through the polarizer 3 into circular polarized light (indicated by the circle), and converts circular polarized light reflected by the reflector 2 and transmitted through the display cell 1 (indicated by the circle) back into linearly polarized light.

Figure 2:
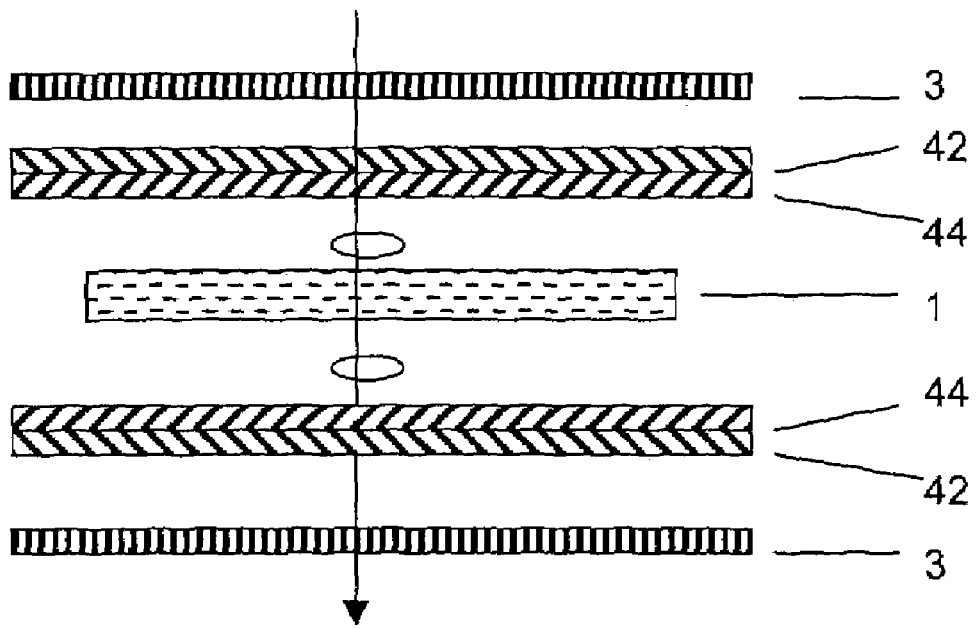
FIG. 2 illustrates a transmissive LCD comprising two AQWFs according to the present invention.

FIG. 2 exemplarily depicts a transmissive LCD according to the invention, comprising a switchable liquid crystal cell 1, like, for example, a TN cell, two linear polarizers 3, and two AQWFs according to the invention comprising a HWF 42 and a QWF 44. The AQWF converts linearly polarized light transmitted through the polarizer 3 into circular polarized light (indicated by the circle), and converts circular polarized light transmitted through the display cell 1 (indicated by the circle) back into linearly polarized light.

Especially preferably the LCD comprises the following elements
- a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates,
- a polarizer arranged outside said transparent substrates, or a pair of polarizers sandwiching said substrates, and
- at least one AQWF according to the present invention, being situated between the liquid crystal cell and at least one of said polarizers,
- it being possible for the above elements to be separated, stacked, mounted on top of each other or connected by means of adhesive layers in any combination of these means of assembly.

Alternatively to the method described above, it is possible to prepare the QWF and HWF from a readily synthesized liquid crystal (LC) polymer that is applied onto a substrate, for example, at a temperature above its glass transition temperature or its melting point, or from solution, e.g., in an organic solvent, aligned into planar orientation, and solidified, e.g., by evaporating the solvent or by cooling below the glass temperature or melting point of the LC polymer. If, for example, a LC polymer with a glass temperature that is higher than ambient temperature is used, evaporation of the solvent or cooling leaves a solid LC polymer film. If, for example, an LC polymer with a high melting point is used, the LC polymer can be applied as a melt onto the substrate which solidifies upon cooling. LC side chain polymers or LC main chain polymers can be used, preferably LC side chain polymers. The LC polymer should preferably be selected such that its glass transition or melting temperature is significantly higher than the operating tempature of the AQWF. For example, LC side chain polymers comprising a polyacrylate, polymethacrylate, polysiloxane, polystyrene or epoxide backbone with laterally attached mesogenic side chains can be used. The LC polymer may also comprise side chains with reactive groups that can be crosslinked after or during evaporation of the solvent to permanently fix the orientation. The LC polymer may also be subjected to mechanical or heat treatment after application to the substrate to improve alignment. The above methods and suitable materials therefor are known to the person skilled in the art.

Especially preferably the QWF and HWF are prepared from a polymerizable liquid crystal material by in-situ polymerization. The polymerizable liquid crystal material preferably comprises at least one monoreactive achiral polymerizable mesogenic compound and at least one di- or multireactive achiral polymerizable mesogenic compound.

If di- or multireactive compounds are present in the polymerizable material, a three-dimensional polymer network is formed and the planar orientation of the LC material is permanently fixed. An optical retardation film made of such a network is self-supporting and shows a high mechanical and thermal stability and a low temperature dependence of its physical and optical properties.

By varying the concentration of the di- and multireactive compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned easily.

A preferred polymerizable LC mixture comprises
- 10–80% of one or more direactive achiral mesogenic compounds,
- 5–80% of one or more monoreactive achiral mesogenic compounds,
- 0 to 10% of one or more chain transfer agents,
- 0 to 3% of one or more surfactants, and
- 0.1 to 10% of one or more photoinitiators.

The polymerizable mesogenic mono-, di- or multireactive compounds used for the instant invention can be prepared by methods which are known per se and which are described, for example, in standard works of organic chemistry such as, for example, Houben-Weyl, Methoden der organischen Chemie, Thieme-Verlag, Stuttgart. Typical examples are described for example in WO 93/22397; EP 0 261 712; DE 19504224; DE 4408171 and DE 4405316. The compounds disclosed in these documents, however, are to be regarded merely as examples that do not limit the scope of this invention.

Examples representing especially useful mono- and direactive polymerizable mesogenic compounds are shown in the following list of compounds, which should, however, be taken only as illustrative and is in no way intended to restrict, but instead to explain the present invention:

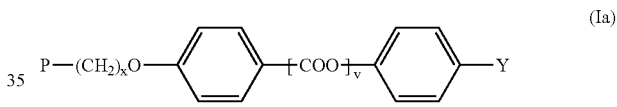
(Ia)

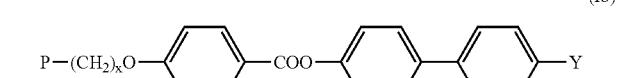
(Ib)

(Ic)

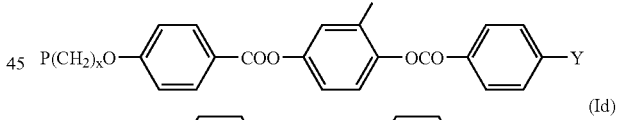
(Id)

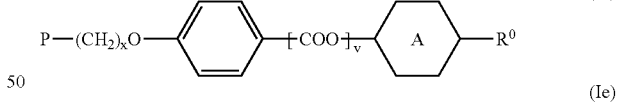
(Ie)

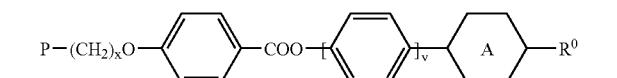
(If)

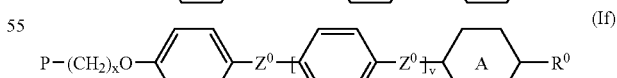
(Ig)

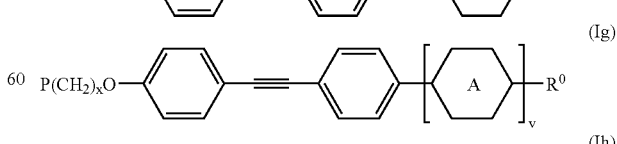
(Ih)

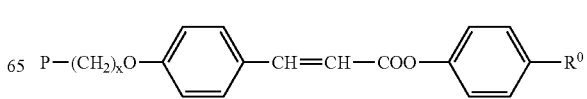

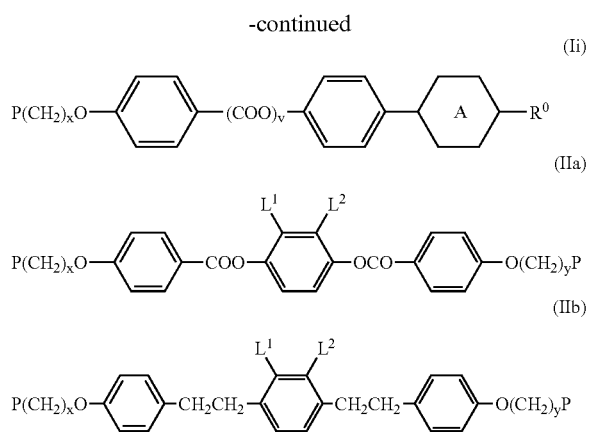

In the above formulae, P is a polymerizable group, preferably an acryl, methacryl, vinyl, vinyloxy, propenyl ether, epoxy or styrene group, x and y are each independently 1 to 12, A is 1,4-phenylene that is optionally mono-, di- or trisubstituted by $L^1$ or 1,4-cyclohexylene, v is 0 or 1, $Z^0$ is —COO—, —OCO—, —CH$_2$CH$_2$—, —C≡C— or a single bond, Y is a polar group, $R^0$ is a non-polar alkyl or alkoxy group, and $L^1$ and $L^2$ are each independently H, F, Cl, CN or an optionally halogenated alkyl, optionally halogenated alkoxy, optionally halogenated alkylcarbonyl, optionally halogenated alkoxycarbonyl or optionally halogenated alkoxycarbonyloxy group, in each case having up to 7 C atoms.

The term 'polar group' in this connection means a group selected from F, Cl, CN, NO$_2$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms. The term 'non-polar group' means an alkyl group with 1 or more, preferably 1 to 12 C atoms or an alkoxy group with 2 or more, preferably 2 to 12 C atoms.

As a substrate for the preparation of the polymer films for example a glass or quarz sheet or a plastic film or sheet can be used. It is also possible to put a second substrate on top of the coated mixture prior to and/or during and/or after polymerization. The substrates can be removed after polymerization or not. When using two substrates in case of curing by actinic radiation, at least one substrate has to be transmissive for the actinic radiation used for the polymerization. Isotropic or birefringent substrates can be used. In case the substrate is not removed from the polymerized film after polymerization, preferably isotropic substrates are used.

Preferably, at least one substrate is a plastic substrate such as for example a film of polyester, such as polyethyleneterephthalate (PET), polyvinylalcohol (PVA), polycarbonate (PC) or triacetylcellulose (TAC), especially preferably, a PET film or a TAC film. As a birefringent substrate, for example, an uniaxially stretched plastic film can be used. For example, PET films are commercially available from ICI Corp. under the trade name Melinex.

The polymerizable material can also be dissolved in a solvent, preferably in an organic solvent. The solution is then coated onto the substrate, for example by spin-coating or other known techniques, and the solvent is evaporated off before polymerization. In most cases it is suitable to heat the mixture in order to facilitate the evaporation of the solvent.

Polymerization of the LC material is preferably achieved by exposing it to actinic radiation. Actinic radiation means irradiation with light, for example, UV light, IR light or visible light, irradiation with X-rays or gamma rays or irradiation with high energy particles, such as ions or electrons. Preferably, polymerization is carried out by photoirradiation, in particular with UV light, very preferably with linear polarized UV light. As a source for actinic radiation for example a single UV lamp or a set of UV lamps can be used. When using a high lamp power the curing time can be reduced. Another possible source for photoradiation is a laser, like, e.g., a UV laser, an IR laser or a visible laser.

Polymerization is carried out in the presence of an initiator absorbing at the wavelength of the actinic radiation. For example, when polymerising by means of UV light, a photoinitiator can be used that decomposes under UV irradiation to produce free radicals or ions that start the polymerization reaction. UV photoinitiators are preferred, in particular radicalic UV photoinitiators. As standard photoinitiator for radical polymerization for example the commercially available Irgacure® 651, Irgacure® 184, Darocure® 1173 or Darocure® 4205 (all from Ciba Geigy AG) can be used, whereas in case of cationic photopolymerization the commercially available UVI 6974 (Union Carbide) can be used.

The polymerizable LC material can additionally comprise one or more other suitable components such as, for example, catalysts, sensitizers, stabilizers, chain-transfer agents, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colorants, dyes or pigments.

In another preferred embodiment the mixture of polymerizable material comprises up to 70%, preferably 1 to 50% of a monoreactive non-mesogenic compound with one polymerizable functional group. Typical examples are alkylacrylates or alkylmethacrylates.

It is also possible, in order to increase crosslinking of the polymers, one can add up to 20% of a non-mesogenic compound with two or more polymerizable functional groups to the polymerizable LC material alternatively or in addition to the di- or multireactive polymerizable mesogenic compounds to increase crosslinking of the polymer. Typical examples for direactive non-mesogenic monomers are alkyldiacrylates or alkyldimethacrylates with alkyl groups of 1 to 20 C atoms. Typical examples for multireactive non-mesogenic monomers are trimethylpropanetrimethacrylate or pentaerythritoltetraacrylate.

It is also possible, one can add one or more chain transfer agents to the polymerizable material in order to modify the physical properties of the inventive polymer film. Especially preferred are thiol compounds, such as monofunctional thiol compounds, like, e.g., dodecane thiol or multifunctional thiol compounds, like, e.g., trimethylpropane tri(3-mercaptopropionate), very preferably mesogenic or liquid crystalline thiol compounds. When adding a chain transfer agent, the length of the free polymer chains and/or the length of the polymer chains between two crosslinks in the inventive polymer film can be controlled. When the amount of the chain transfer agent is increased, the polymer chain length in the obtained polymer film is decreasing.

Planar alignment can be achieved for example by shearing the material, e.g., by means of a doctor blade. It is also possible to apply an alignment layer, for example a layer of rubbed polyimide or sputtered $SiO_x$, on top of at least one of the substrates. Planar alignment can also be achieved by rubbing the substrate without applying an additional alignment layer, e.g., by means of a rubbing cloth or a rubbing roller. If a rubbed substrate is used for the preparation of a QWF or HQWF according to the invention, the direction of the optical axis of the QWF and the HWF usually corresponds to the rubbing direction of the substrate.

Planar alignment with a low tilt angle can also be achieved or enhanced by adding one or more surfactants to the polymerizable mesogenic material. Suitable surfactants are described for example in J. Cognard, Mol. Cryst. Liq. Cryst. 78, Supplement 1, 1–77 (1981). Particularly preferred are non-ionic surfactants, e.g., non-ionic fluorocarbon surfactants, for example, the commercially available Fluorad® (from 3M), or Zonyl FSN® (from DuPont).

The examples below serve to illustrate the invention without limiting it. In the foregoing and the following, all temperatures are given in degrees Celsius, and all percentages are by weight, unless stated otherwise.

EXAMPLE 1

The following polymerizable mixture was prepared

| | |
|---|---|
| Compound (1) | 42.25% |
| Compound (2) | 32.86% |
| Compound (3) | 18.78% |
| Irgacure 907 ® | 5.63% |
| FC171 ® | 0.48% |

Irgacure 907 is a photoinitiator commercially available from Ciba AG (Basel, Switzerland). FC171® is a non-polymerizable fluorocarbon surfactant commercially available from 3M (St. Paul, Minn., USA).

Figure 4:
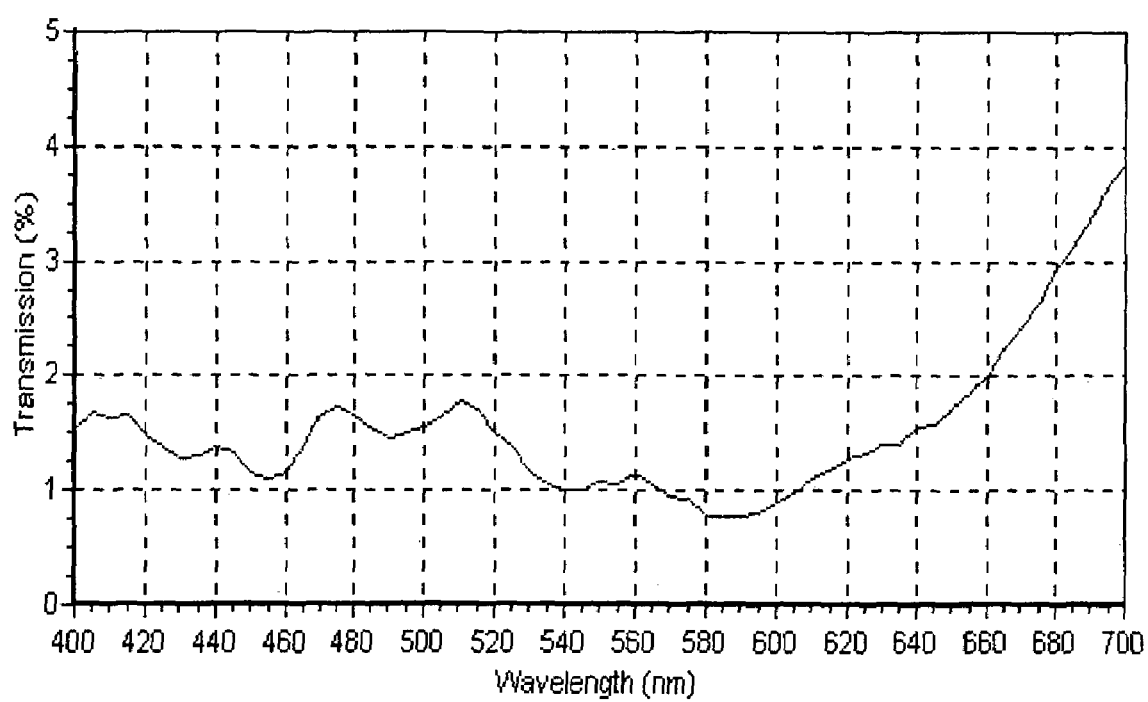
FIG. 4 shows the transmission versus wavelength of the AQWF according to example 1 of the present invention.

The reflection spectrum of the AQWF was measured and is depicted in FIG. 4. The AQWF has a low reflection across the visible spectrum. Further reductions in reflectance can be achieved by a suitable anti reflective or anti glare layer on the polarizer.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosure of all applications, patents and publications, cited herein and of corresponding European application No. 02010985.6, filed May 17, 2002 is incorporated by reference herein.

The invention claimed is:

1. An achromatic quarter wave film comprising at least one quarter wave film and at least one half wave film, wherein the at least one quarter wave film and the at least one half wave film comprise a polymerized liquid crystalline material, wherein the quarter wave film and half wave film are prepared from a polymerizable liquid crystal material by in-situ polymerisation, wherein said polymerizable liquid crystal material comprises at least one monoreactive achiral polymerizable mesogenic compound and at least one di- or multi- reactive achiral polymerizable mesogenic compound.

2. An achromatic quarter wave film comprising at least one quarter wave film and at least one half wave film, wherein the at least one quarter wave film and the at least one half wave film comprise a polymerized liquid crystalline

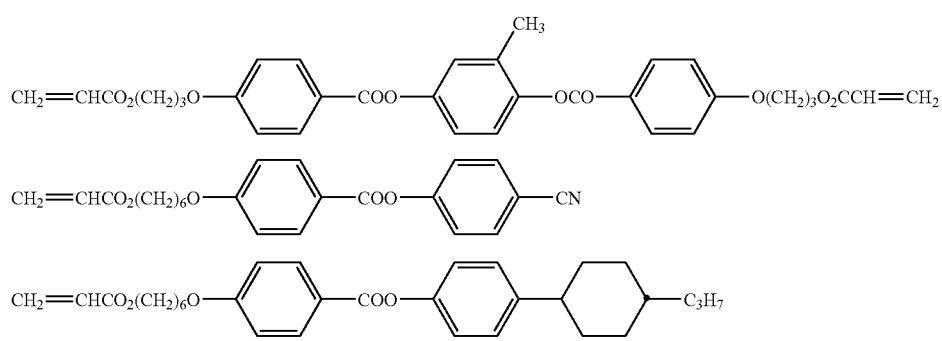

A QWF and a HWF were prepared from the above mixture by coating onto a rubbed substrate and curing under UV light, as described in WO 98/04651. The QWF has a thickness of 0.83 μm and a retardation of 125 nm. The HWF has a thickness of 1.66 μm and a retardation of 250 nm, measured at a wavelength of 550 nm.

Figure 3:
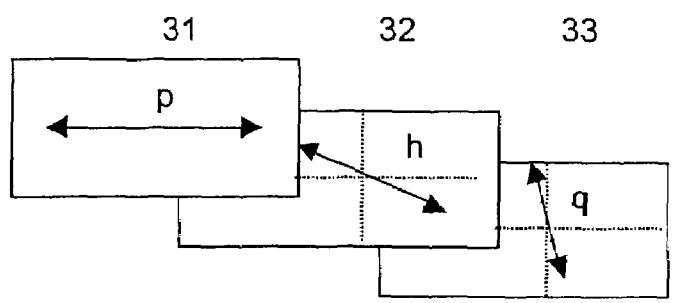
FIG. 3 depicts an AQWF according to example 1 of the present invention.

An AQWF was formed from the above films as depicted in FIG. 3, with the QWF 33 and HWF 32 laminated to a standard linear absorption polarizer 31. The rubbing direction q of the substrate of the QWF 33 and the rubbing direction h of the substrate of the HWF 32, which correspond to the direction of the optical axis of the QWF and HWF, form an angle of α(q)=105° and α(h)=165°, respectively, with the polarizer absorption axis p.

material, and the quarter wave film has an optical retardation of 80 to 180 nm at a wavelength of 550 nm, and the half wave film has an optical retardation of 200 to 360 nm at a wavelength of 550 nm.

3. An achromatic quarter wave film according to claim 1, wherein the thickness of the quarter wave film is 0.6 to 1.4 μm and the thickness of the half wave film is 1.4 to 3 μm.

4. An achromatic quarter wave film according to claim 1, wherein the quarter wave film and the half wave film comprise a crosslinked nematic liquid crystal material.

5. An achromatic quarter wave film according to claim 1, wherein the film planes of the quarter wave film and the half wave film are substantially parallel to each other and their optical axes are crossed at an angle of 40 to 80 degrees.

6. An achromatic quarter wave film according to claim 1, further comprising a linear polarizer at the side facing the half wave film.

7. In an electrooptical display, an organic light emitting diode, or a cathode ray tube display, wherein the improvement in said electrooptical display, organic light emitting diode, or cathode ray tube display is that said electrooptical display, organic light emitting diode, or cathode ray tube display comprises an achromatic quarter wave film according to claim 1.

8. In a liquid crystal display, wherein the improvement in said liquid crystal display is that said liquid crystal display comprises an achromatic quarter wave film according to claim 1.

9. A liquid crystal display according to claim 8, which is a twisted nematic, an optically compensated bend, a pi-cell, a vertically aligned or a multi-domain vertically aligned mode display.

10. A liquid crystal display according to claim 8, which is a reflective or transflective display.

11. In a liquid crystal display, wherein the improvement in said liquid crystal display is that said liquid crystal display comprises a light enhancing or anti-reflection film comprising an achromatic quarter wave film comprising at least one quarter wave film and at least one half wave film, wherein the at least one quarter wave film and the at least one half wave film comprise a polymerized liquid crystalline material, wherein
  a) the quarter wave film and the half wave film are substantially parallel to each other and their optical axes are crossed at an angle of 55 to 65 degrees, and/or
  b) the quarter wave film and half wave film are prepared from a polymerizable liquid crystal material by in-situ polymerisation, wherein said polymerizable liquid crystal material comprises at least one monoreactive achiral polymerizable mesogenic compound and at least one di- or multi- reactive achiral polymerizable mesogenic compound, and/or
  c) the quarter wave film has an optical retardation of 100 to 130 nm at a wavelength of 550 nm, and the half wave film has an optical retardation of 200 to 360 nm at a wavelength of 550 nm, and/or
  d) the quarter wave film has an optical retardation of 80 to 180 nm at a wavelength of 550 nm, and the half wave film has an optical retardation of 220 to 260 nm at a wavelength of 550 nm, and/or
  e) the thickness of the quarter wave film is 0.9 to 1.2 μm and the thickness of the half wave film is 1.4 to 3 μm.

12. A process for preparing an achromatic quarter wave film according to claim 1, comprising adhering with an adhesive layer or laminating together the at least one quarter wave film and the at least one half wave film, or coating an alignment layer onto the at least one quarter wave film and preparing the at least one half wave film onto said alignment layer or coating an alignment layer onto the at least one half wave film and preparing the at least one quarter wave film onto said allignement layer.

13. In a compensator, wherein the improvement in said compensatior is that said compensator comprises an achromatic quarter wave film according to claim 1.

14. An achromatic quarter wave film according to claim 1, wherein the quarter wave film and the half wave film comprise a polymerized or crosslinked liquid crystal polymer film with planar orientation.

15. A liquid crystal display comprising a liquid crystal cell, at least one polarizer on at least one of the sides of the liquid crystal cell, and at least one achromatic quarter wave film according to claim 1 situated between the liquid crystal cell and the at least one polarizer.

16. An achromatic quarter wave film according to claim 1, wherein the polymerizable liquid crystal material comprises
  10–80% of one or more direactive achiral mesogenic compounds,
  5–80% of one or more monoreactive achiral mesogenic compounds,
  0 to 10% of one or more chain transfer agents,
  0 to 3% of one or more surfactants, and
  0.1 to 10% of one or more photoinitiators.

17. An achromatic quarter wave film according to claim 1, wherein the polymerizable liquid crystal material comprises up to 70% of a monoreactive non-mesogenic compound with one polymerizable functional group.

18. An achromatic quarter wave film according to claim 1, wherein the polymerizable liquid crystal material comprises one or more of the following

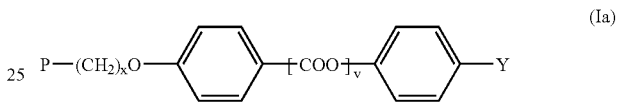
(Ia)

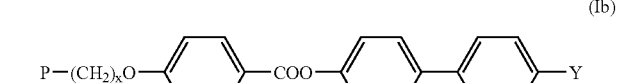
(Ib)

(Ic)

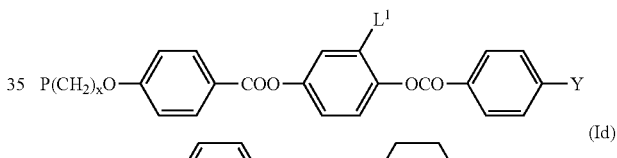
(Id)

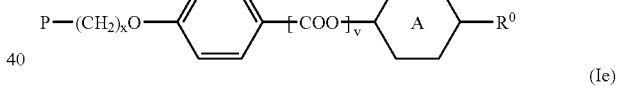
(Ie)

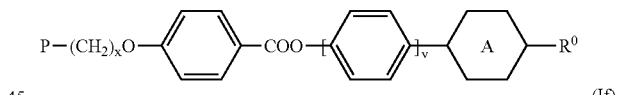
(If)

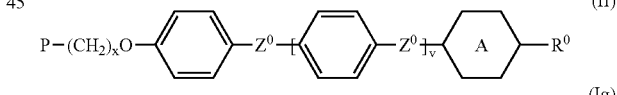
(Ig)

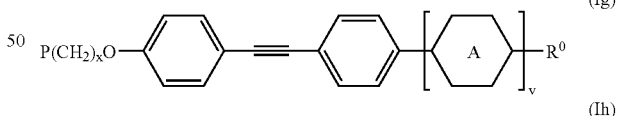
(Ih)

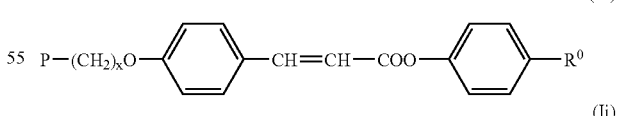
(Ii)

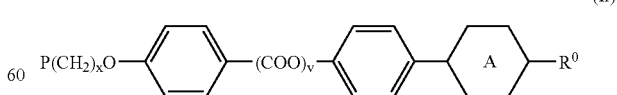
(IIa)

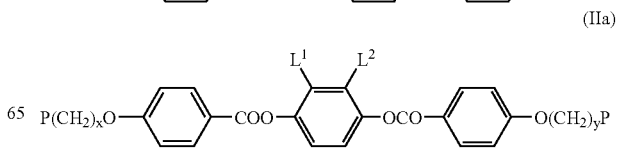

-continued

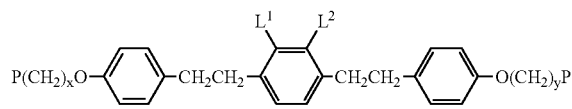
(IIb)

wherein

P is a polymerizable group, x and y are, each independently, 1 to 12,

A is 1,4-phenylene, optionally mono-, di-, or tri-substituted by $L^1$ or 1,4-cyclohexylene, v is 0 or 1, $Z^0$ is —COO—, —OCO—, —CH$_2$CH$_2$—, —C≡C— or a single bond, Y is a polar group, $R^0$ is a non-polar alkyl or alkoxy group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

19. An achromatic quarter wave film according to claim 2, wherein the quarter wave film has an optical retardation of 100 to 130 nm at a wavelength of 550 μm.

20. An achromatic quarter wave film according to claim 2, wherein the half wave film has an optical retardation of 220 to 260 nm at a wavelength of 550 μm.

21. An achromatic quarter wave film according to claim 3, wherein the thickness of the quarter wave film is 0.9 to 1.2 μm.

22. An achromatic quarter wave film according to claim 3, wherein the thickness of the half wave film is 1.6 to 2.2 μm.

23. An achromatic quarter wave film according to claim 1, wherein the quarter wave film and the half wave film are substantially parallel to each other and their optical axes are crossed at an angle of 55 to 65 degrees.

24. An achromatic quarter wave film according to claim 1, wherein
the quarter wave film and the half wave film are substantially parallel to each other and their optical axes are crossed at an angle of 55 to 65 degrees, and/or
the quarter wave film has an optical retardation of 100 to 130 nm at a wavelength of 550 nm, and the half wave film has an optical retardation of 200 to 360 nm at a wavelength of 550 nm, and/or
the quarter wave film has an optical retardation of 80 to 180 nm at a wavelength of 550 nm, and the half wave film has an optical retardation of 220 to 260 nm at a wavelength of 550 nm, and/or
the thickness of the quarter wave film is 0.9 to 1.2 μm and the thickness of the half wave film is 1.4 to 3 μm.

25. An achromatic quarter wave film according to claim 2, wherein
the quarter wave film and the half wave film are substantially parallel to each other and their optical axes are crossed at an angle of 55 to 65 degrees, and/or
the quarter wave film and half wave film are prepared from a polymerizable liquid crystal material by in-situ polymerisation, wherein said polymerizable liquid crystal material comprises at least one monoreactive achiral polymerizable mesogenic compound and at least one di- or multi- reactive achiral polymerizable mesogenic compound, and/or
the thickness of the quarter wave film is 0.9 to 1.2 μm and the thickness of the half wave film is 1.4 to 3 μm.

26. An achromatic quarter wave film according to claim 2, wherein the quarter wave film and half wave film are prepared from a polymerizable liquid crystal material by in-situ polymerisation, wherein said polymerizable liquid crystal material comprises at least one monoreactive achiral polymerizable mesogenic compound and at least one di- or multi- reactive achiral polymerizable mesogenic compound.

27. In a liquid crystal display, wherein the improvement in said liquid crystal display is that said liquid crystal display comprises a light enhancing or anti-reflection film comprising an achromatic quarter wave film according to claim 1.

* * * * *